United States Patent [19]

Wood et al.

[11] Patent Number: 5,389,250
[45] Date of Patent: Feb. 14, 1995

[54] SELF DILUTING FEEDWELL FOR THICKENER DILUTION

[75] Inventors: Leonard J. A. Wood, Wyee; Simon D. Turner, Summerland Point; Timothy J. Laros, Marsfield, all of Australia; Robert C. Emmett, Jr., Salt Lake City, Utah

[73] Assignee: Baker Hughes Incorporated, Houston, Tex.

[21] Appl. No.: 767,072

[22] Filed: Sep. 26, 1991

[51] Int. Cl.$^6$ ............................................. B01D 21/24
[52] U.S. Cl. .................................... 210/194; 210/205; 210/206; 210/207; 210/519; 417/198; 366/136; 366/174
[58] Field of Search ............... 210/519, 520, 194, 197, 210/205, 206, 207, 525, 198.1; 417/176, 183, 197, 198; 366/136, 174

[56] References Cited

U.S. PATENT DOCUMENTS

| | | |
|---|---|---|
| 1,344,370 | 6/1920 | Allen . |
| 1,452,016 | 4/1923 | Allen . |
| 1,472,317 | 10/1923 | Allen . |
| 2,322,087 | 6/1943 | Atwood ................................ 366/174 |
| 2,365,293 | 12/1944 | Robinson ............................ 366/136 |
| 2,528,094 | 10/1950 | Walker . |
| 2,577,797 | 12/1951 | Moyer ................................. 366/136 |
| 2,678,730 | 5/1954 | Coulter . |
| 2,961,099 | 11/1960 | Lind .................................... 210/519 |
| 2,961,100 | 11/1960 | Katz .................................... 210/519 |
| 3,136,724 | 6/1964 | Lind .................................... 210/525 |
| 3,228,530 | 1/1966 | Quast .................................. 210/519 |
| 3,395,800 | 8/1968 | Kraus .................................. 210/525 |
| 3,532,218 | 7/1970 | Blottnitz et al. . |
| 3,534,861 | 10/1970 | Hubbell .............................. 210/519 |
| 3,770,131 | 11/1973 | Davis . |
| 3,891,557 | 6/1975 | Edgerton ............................ 210/519 |
| 3,926,805 | 12/1975 | Walker . |
| 3,994,808 | 11/1976 | Kearney ............................. 366/136 |
| 4,022,697 | 5/1977 | Pankuch . |
| 4,038,185 | 7/1977 | Kline ................................... 210/519 |
| 4,053,421 | 10/1977 | Pentz et al. . |
| 4,054,514 | 10/1977 | Oltmann . |
| 4,055,494 | 10/1977 | Emmett, Jr. et al. . |
| 4,069,143 | 1/1978 | Friesenborg et al. . |
| 4,097,026 | 6/1978 | Haindl ................................ 366/336 |
| 4,127,488 | 11/1978 | Bell ..................................... 210/519 |
| 4,173,534 | 11/1979 | Kelly . |
| 4,199,452 | 4/1980 | Mandt . |
| 4,247,400 | 1/1981 | King et al. . |
| 4,267,052 | 5/1981 | Chang . |
| 4,270,676 | 6/1981 | Green . |
| 4,272,369 | 9/1981 | Love . |
| 4,278,541 | 7/1981 | Eis et al. . |
| 4,293,416 | 10/1981 | Keotekliam . |
| 4,300,919 | 11/1981 | Lewis .................................. 366/136 |
| 4,302,328 | 11/1981 | Van Note . |
| 4,351,733 | 9/1982 | Salzer et al. . |
| 4,357,242 | 11/1982 | Chandler . |

(List continued on next page.)

FOREIGN PATENT DOCUMENTS

| | | |
|---|---|---|
| 622238 | 4/1992 | Australia . |
| 1517647 | 4/1969 | Germany . |
| 798983 | 7/1958 | United Kingdom . |

OTHER PUBLICATIONS

Mueller, N. H. G., "Water Jet Pump" *Journal of the Hydraulics Division-Proceedings of the American Society of Civil Engineers,* May 1964, pp. 83-111.

(List continued on next page.)

*Primary Examiner*—Thomas M. Lithgow
*Attorney, Agent, or Firm*—Trask, Britt & Rossa

[57] ABSTRACT

A self-diluting feedwell for a thickener or settling tank includes a delivery pipe for providing an influent feed stream of slurry, a nozzle for directionally discharging the influent feed stream, and an eductor structure including a launder zone for receiving the nozzle discharge, a throat zone for creating a reduced pressure area for eduction of diluent into the launder zone, and a discharge zone for dispensing the diluted influent into a thickener or settling tank.

29 Claims, 10 Drawing Sheets

U.S. PATENT DOCUMENTS

| | | |
|---|---|---|
| 4,364,834 | 12/1982 | Wawre . |
| 4,390,429 | 6/1983 | Lejeune .................. 210/519 |
| 4,427,551 | 1/1984 | Duveau . |
| 4,541,850 | 9/1985 | Oda et al. . |
| 4,545,892 | 10/1985 | Cymbalisty ............. 208/425 |
| 4,555,340 | 11/1985 | Boyle ...................... 210/525 |
| 4,559,146 | 12/1985 | Roets . |
| 4,830,507 | 5/1989 | Batatto et al. . |
| 4,859,346 | 8/1989 | Wood . |
| 4,869,814 | 9/1989 | Hughes .................... 210/194 |
| 4,889,639 | 12/1989 | Hudgin ..................... 210/194 |
| 4,940,545 | 7/1990 | DiGregorio et al. . |
| 4,999,115 | 3/1991 | Peterson .................. 210/519 |
| 5,015,392 | 5/1991 | Taylor . |
| 5,147,556 | 9/1992 | Taylor . |

OTHER PUBLICATIONS

Silvester, R., "Characteristics and applications of the water–jet–pump", *La Houille Blanche,* Aug.–Sep., 1961, pp. 451–460.

Silvester, Richard, "Coastal Engineering, II", Elsevier Scientific Publishing Company, New York, 1974, pp. 242–249, 256–259, 282–283.

Silvester, R., et al. "The Jet Pump Using Liquids of Different Density", Symposium on Jet Pumps and Ejectors, Paper 11, pp. 171–181.

Silvester, R., "Jet Mixers in Sewage Outfalls", *Technical News Items,* p. 95.

Unknown, "Jet Mixer Used on Effluent Main for Surfers Paradise Sewerage", *The Journal of the Institution of Engineers,* Australia, Mar., 1966, pp. 74–76.

SELF DILUTING FEEDWELL FOR THICKENER DILUTION

BACKGROUND OF THE INVENTION

1. Field of the Invention

This application relates generally to feedwells for diluting and dispensing an influent slurry feed stream into a settling tank or basin, and more specifically to a self-diluting feedwell for diluting and dispensing an influent slurry feed stream into a thickener, clarifier, or settling tank without the need for a dilution pump or the addition of dilution liquor from an outside source.

2. State of the Art

Slurries or suspensions comprising liquids carrying suspended particles are typically subjected to a process called clarification to separate suspended particles from supernatant liquid. Typically, clarification is accomplished by continuously feeding an influent slurry or suspension feed stream into a settling tank or thickener, where suspended particles are allowed to gravity settle and form a sludge or thickened mud on the bottom of the tank. The thickened material is removed and further processed or disposed of, while the clarified liquid supernatant is either discharged, reused, or subjected to further clarification.

A feedwell is often used to introduce an influent feed stream flow into the settling tank or basin, as well as to provide a means of flocculating the feed stream and of distributing the feed stream into the tank in a nonturbulent manner. Disruption of the thickened material in the tank is minimized if the flow velocity of the influent feed stream is reduced before the influent enters to the tank. Typically, a feedwell dissipates the flow velocity by directing the feed stream into a circular or rectangular compartment in the center of the settling tank or basin which is separated from the contents of the settling tank or basin. The compartment is frequently mounted on a tower, column or pier in the center of the tank, but may be positioned around the perimeter of the tank or across the diameter of the tank. As the influent feed stream flows into the channel, much of the kinetic energy of the stream is dissipated due to the reduction in velocity head and the friction of the influent with the channel floor and walls. The feedwell may also contain a series of baffles to help dissipate the kinetic energy of the influent feed stream. The relatively quiescent influent is then allowed to enter the settling tank through ports in the sides or through an open bottom of the feedwell, or by allowing it to spill over the edge of the channel or from an influent weir into the settling tank.

The sedimentation process is sometimes expedited by adding a flocculating reagent to the influent before it enters the settling tank. The flocculating reagent typically has a polymeric molecular structure which agglomerates with suspended particles in the influent to form aggregate clusters called flocs. Flocs have a greater density than the discrete suspended particles, and settles to the floor of the tank in a more celeritous manner.

Several factors influence the effectiveness of flocculating reagents to agglomerate with suspended particles. The flocculating reagent must be mixed thoroughly with the influent and allowed ample time to agglomerate. If the concentration of suspended particles in the influent is low, the flocculating reagent may need to be stirred through the influent. This requires the addition of a stirring mechanism or flocculator to the settling tank. If the concentration of particles is high, the influent may need to be diluted for optimum flocculation to occur.

Dilution of an influent feed stream is currently accomplished by several methods. A pump may be employed to add a liquid, such as previously clarified liquor from the settling tank, to the influent feed stream. The feedwell channel can also be positioned below the liquid surface of the settling tank so that previously clarified liquor spills over the side of the feedwell and into the channel, diluting the feed stream. Problems with using a pump include the added expense and maintenance of the pump and power costs for operation thereof. The main drawback of the spill method is the lack of practical means to adjust the dilution ratio.

The present invention obviates many of the problems and expenses associated with prior art methodologies for diluting and flocculating an influent feed stream by using the principles of eductive flow and eductors to thoroughly and automatically mix a dilution liquor with an influent feed stream. The invention obviates the need for mechanical pumps or gravity feed apparatus to add a dilution liquor to an influent feed stream. The dilution ratio of influent to diluent can also be infinitely adjusted for different types and concentrations of influent suspensions and slurries. The invention also automatically compensates for changes in the influent flow rate so the dilution ratio remains substantially constant, independent of the influent flow rate.

SUMMARY OF THE INVENTION

A basin or tank for settling, thickening, or clarifying liquids from suspended solids may be provided with an eductive feedwell of a configuration in accordance with the present invention. An influent feed pipe delivers an influent slurry feed stream (hereinafter referred to for convenience as the "feed stream" or the "influent feed stream") to a directional nozzle which directs the flow of the influent feed stream into the eductor structure associated with the feedwell. The eductor may generally be described as a walled channel including a launder portion for receiving the influent feed stream, one or more ports for introducing a diluent into the influent feed stream, a narrow throat portion to bring about eduction of the diluent into the feed stream, and a discharge portion from which diluted and flocculated influent is introduced into the basin.

In the preferred embodiments, the feedwell defines a compartment which surrounds and is mounted on a tower, column or pier in the center of a settling tank or thickener. The feed pipe containing the influent feed stream supplies a pair of directional nozzles which split the feed stream into two feed streams flowing in opposing directions in the feedwell. The two feed streams are directed into duplicate but contrapositioned eduction zones of the feedwell. Inner and outer feedwell walls defining eductor channels are connected by a floor extending under the eduction zones so the influent stream is isolated from the liquor below the feedwell in the settling tank during dilution and treatment. The treated influent then passes into an open floored area of each eductor channel and flows from the feedwell into the tank.

The launder portion of the feedwell eductor has walls which converge in the direction of influent flow to a narrow launder outlet. The influent feed stream from a directional nozzle is added to the launder where the walls are wider apart and is directed into the converging wall portion toward the narrow launder outlet. The launder outlet opens into the upstream end of a narrow throat portion of the channel having substantially parallel walls and a floor. The narrow throat portion preferably extends in a generally straight line with the flow direction from the directional nozzle. The downstream end of the narrow throat portion opens into a discharge zone having diverging walls. An eductor is thus formed by the converging walls of the launder and the narrow throat portion extending therefrom. The velocity of the influent feed stream increases as it travels through the nozzle into the converging launder portion and through the narrow throat portion of the eductor.

The eductor functions to pump clarified liquor from the settling basin through eduction ports in the launder wall into the launder to dilute the influent feed stream. This is effected using the kinetic energy of the influent feed stream to create a reduced pressure via the acceleration of the influent through the eductor throat, pumping the clarified liquor into the eductor and mixing it with the influent.

When the diluted influent feed stream exits the narrow throat portion, it flows into a discharge zone. Flocculating headers may be located in the discharge zone to add flocculating reagent to the diluted influent. The flocculated mixture stills in the discharge zone and is then discharged into an open bottom portion of the feedwell, through which the diluted and flocculated influent is distributed into the settling tank.

BRIEF DESCRIPTION OF THE DRAWINGS

In the drawings which illustrate what is presently regarded as the best modes for carrying out the invention.

DETAILED DESCRIPTION OF THE ILLUSTRATED EMBODIMENT

Figure 1:
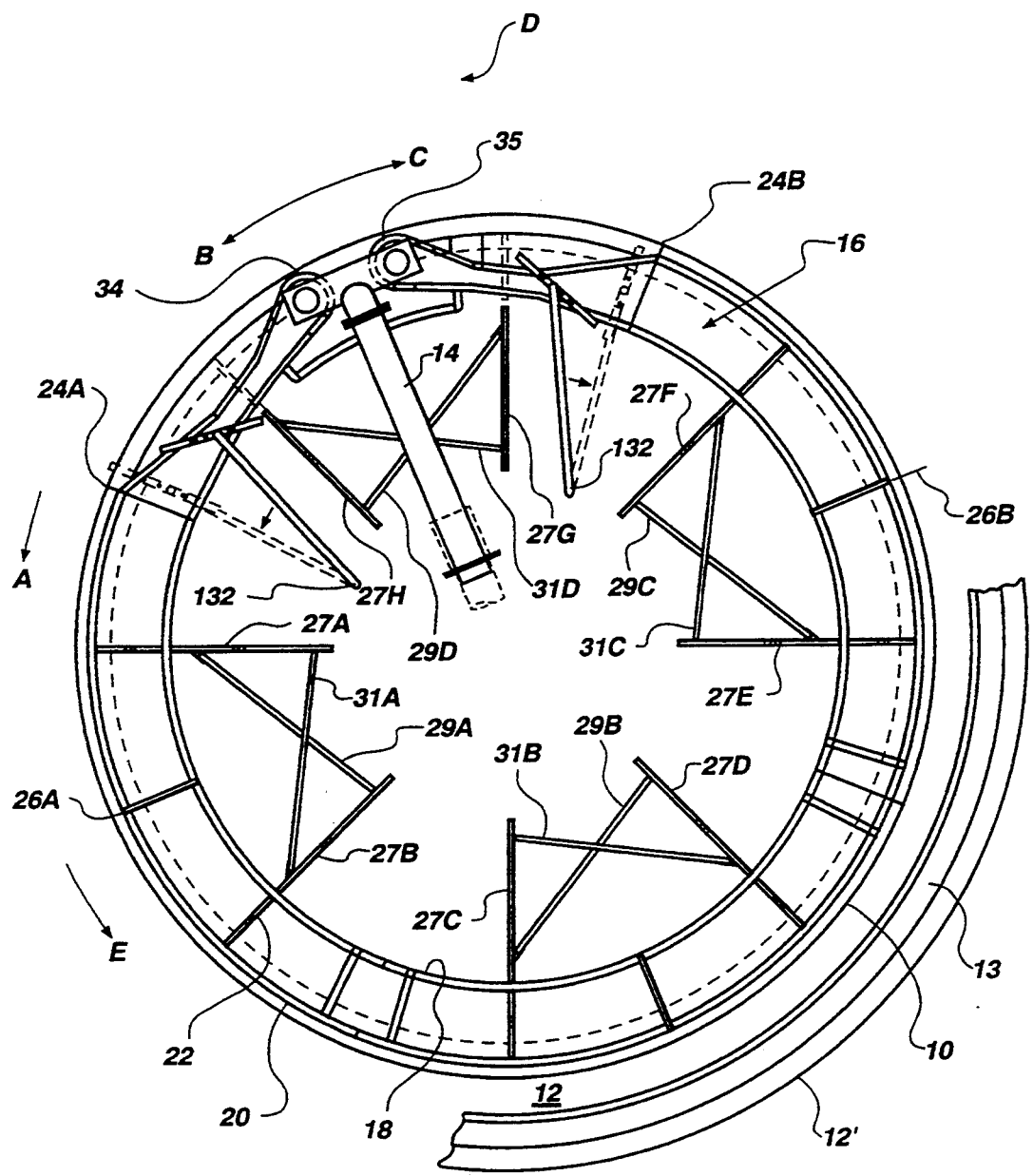
FIG. 1 is a plan view of an eductive feedwell of the present invention.

FIG. 1 depicts a generally circular eductive feedwell 10 according to the present invention, substantially concentrically disposed within a settling tank or thickener 12 (the boundary wall 12' and clean liquor collection trough or overflow launder 13 of which are partially shown in exaggeratedly close proximity to feedwell 10), and configured to function as an eductive, self diluting feedwell for dilution of an influent feed stream delivered by feed pipe 14. The feedwell may be supported by a tower, column, pier or pedestal (not shown) in the center of the tank, or may extend around the perimeter of the settling tank. An inner feedwell wall 18 and an outer feedwell wall 20 define a generally arcuate annular channel 22 of substantially constant width and having a semi-circular "C" shape extending in direction A from joint 24A to joint 24B along approximately 270 degrees of the generally circular feedwell 10. A feedwell floor 16 extends between feedwell walls 18 and 20, and extends bidirectionally under the feedwell 10 in directions B and C from the area between arcuate end walls 34 and 35 to joints 26A and 26B, approximately 180 degrees around the generally circular feedwell 10. The remaining approximately 180 degrees of the feedwell 10, extending in direction E from joint 26A to joint 26B, is preferably an open bottom structure, but may have a floor in an alternate embodiment wherein the inner feedwell wall 18 is removed between joints 26A and 26B, and floor 16 acts as a spill lip over which the diluted feed stream may flow downwardly into settling tank or thickener 12.

Primary bracing structures 27A through 27H are attached to the inner feedwell wall 18 of feedwell 10 and extend inwardly to support the feedwell 10 on the previously-referenced center tower, column, pedestal or pier (not shown) in the tank 12. Cross bracing structures 29A through 29D and 31A through 31D are interconnected between pairs of primary bracing structures 27A through 27H as shown in FIG. 1 to lend rigidity to the primary bracing structures 27A through 27H. Structures 29D and 31D also support feed pipe 14. Other supporting structure arrangements as known in the art may also be employed to support feedwell 10, including without limitation a bridge structure which spans the diameter of the settling tank.

Figure 2:
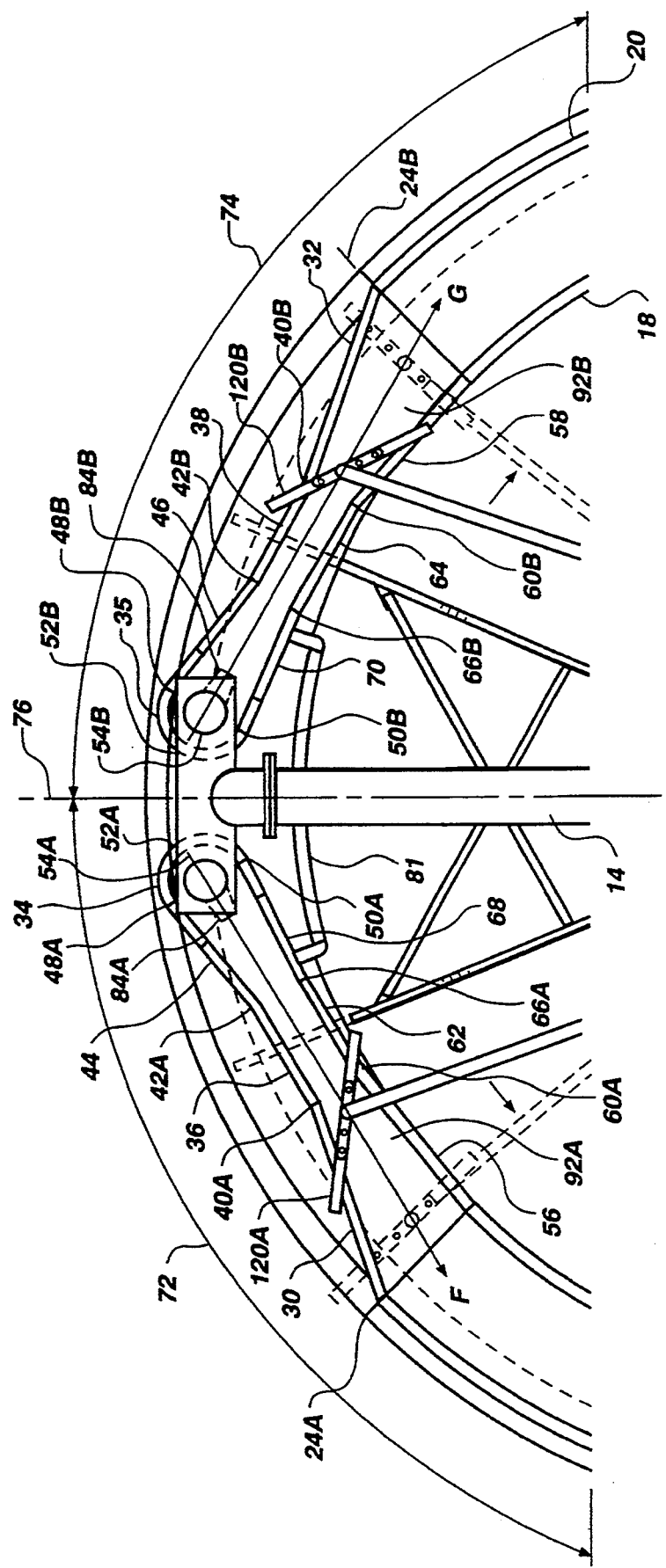
FIG. 2 is an enlarged plan view of the circled portion indicated by the letter D in FIG. 1.

The eductor structure of feedwell 10 in the circled portion indicated by the letter D in FIG. 1 is critical to the invention. Referring to FIG. 2, which illustrates an enlarged view of the circled portion D in FIG. 1, outer feedwell wall 20 ceases to follow an arcuate path at wall joints 24A and 24B and bends inwardly therefrom to form two first outer wall straight sections 30 and 32. Outer feedwell wall 20 then bends outwardly at outer wall joints 40A and 40B to form a pair of second outer wall straight sections 36 and 38. A third set of outer wall joints 42A and 42B redirects outer wall 20 outwardly again to form a pair of third outer wall straight sections 44 and 46. At a fourth pair of outer wall joints 48A and 48B, outer wall 20 attaches to a pair of arcuate end walls 34 and 35 which have bends 52A and 52B respectively, and respective radii 54A and 54B. Arcuate end walls 34 and 35 bend approximately 180 degrees through bends 52A and 52B respectively to attach to the inner wall 18 at inner wall joints 50A and 50B. Inner feedwell wall 18 ceases to bend in an arcuate path at joints 24A and 24B and extends toward outer wall 20 to form first inner wall straight sections 56 and 58. Inner wall 18 then bends inwardly at inner wall joints 60A and 60B to form a pair of second inner wall straight sections 62 and 64, which substantially parallel outer walls straight sections 36 and 38, respectively. The angles of the bends at outer wall joints 40A and 40B and inner wall joints 60A and 60B are such as to cause second outer wall sections 36 and 38, and second inner wall sections 62 and 64, to also be substantially aligned with influent flow directional arrows F and G respectively. Inner wall 18 bends inwardly again at inner wall joints 66A and 66B to form a pair of third inner wall straight sections 68 and 70. Inner wall straight sections 68 and 70 attach to arcuate end walls 34 and 35 at inner wall joints 50A and 50B, respectively, to enclose channel 22.

Thus, two substantially identical feed stream dilution and treatment branches, bracketed and indicated by reference numerals 72 and 74, extend in opposite directions around feedwell 10 from a center line 76. Branch 74 has the same structure as branch 72 and functions in an identical manner but is assembled in contraposition. Both of the branches, 72 and 74, and the direction of influent flow, may be said to be generally tangentially disposed to the circular portion of channel 22.

Figure 3:
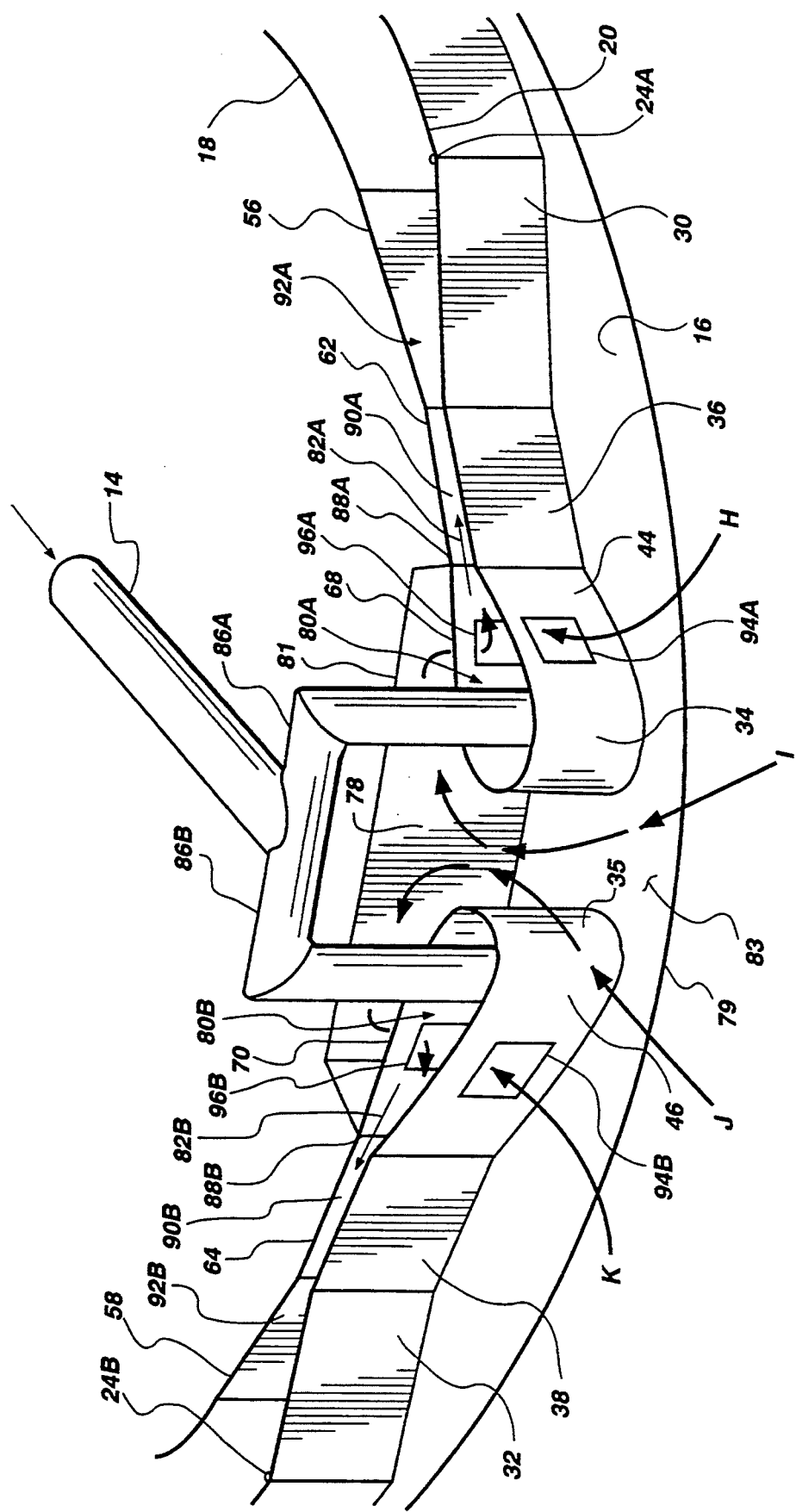
FIG. 3 is perspective view of the circled portion indicated by the letter D in FIG. 1.

Referring to FIGS. 2 and 3, arcuate end walls 34 and 35, third outer straight wall sections 44 and 46, and third inner straight wall sections 68 and 70 define a pair of launders 80A and 80B with walls converging in the direction of influent flow 82A and 82B. Influent pumped through feed pipe 14 is diverted by feed pipe branches 86A and 86B into directional nozzles 84A and 84B which, as best shown in FIG. 2, direct the influent into launders 80A and 80B, respectively. The nozzles 84A and 84B are oriented so that the influent is directed into the converging wall portions of the launders 80A and 80B toward launder outlets 88A and 88B. The launder outlets 88A and 88B open into the upstream ends of a pair of narrow throat portions 90A and 90B. The narrow throat portions 90A and 90B open at the downstream ends into a pair of discharge zones 92A and 92B. The walls of discharge zones 92A and 92B diverge from the downstream ends of narrow throats 90A and 90B to enlarge the width of channel 22.

As best illustrated by FIG. 3, a pair of eductor structures are created by the convergence of the feedwell walls in launders 80A and 80B, followed by the narrow walls through narrow throats 90A and 90B, in turn followed by divergence of the feedwell walls in discharge zones 92A and 92B. The eductors function as jet pumps to educt previously clarified liquor from settling basin 12 through eduction ports 94A and 94B, and 96A and 96B into launders 80A and 80B to dilute the influent feed stream.

Dilution liquor chamber 78, which extends interiorly of feedwell 10, includes a floor 79 which is preferably formed as part of feedwell floor 16, and a back wall 81. Dilution liquor chamber 78 is in fluid communication with settling tank 12 via mouth 83, and functions to permit access by clarified liquor from the tank 12 into the eduction ports 96A and 96B inside the periphery of feedwell 10. The floor 79 of eduction liquor chamber 78 substantially prevents eduction of settled solids from the bottom of settling tank 12 from entering launders 80A and 80B through eduction ports 94A and 94B, and 96A and 96B. The general flow of dilution liquid from the tank 12 into eduction liquor chamber 78 and launders 80A and 80B is indicated by the series of directional arrows labeled with reference letters H, I, J, and K.

Figure 4:
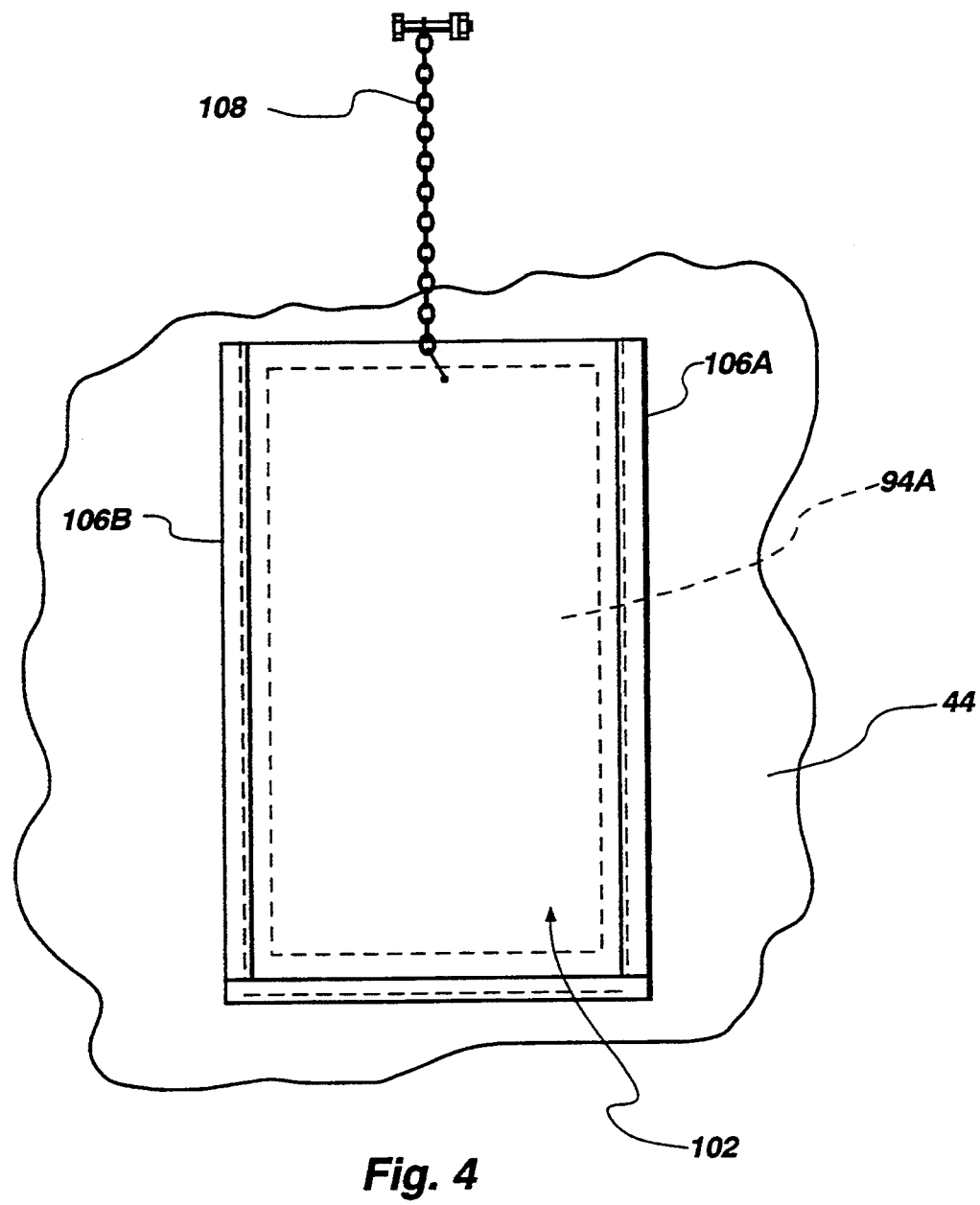
FIG. 4 is a front elevation view of an adjustable eduction port gate.
Figure 5:
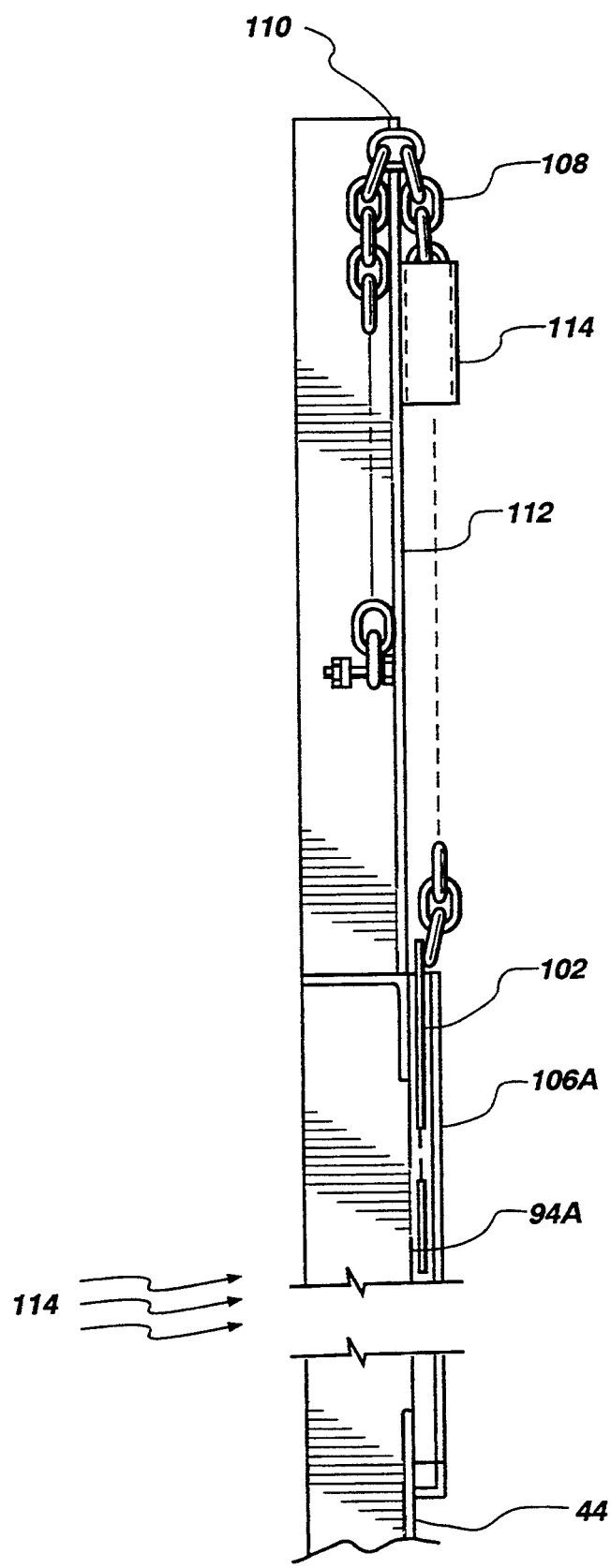
FIG. 5 is a side elevation view of an adjustable eduction port gate.

Eduction ports 94A and 94B, and 96A and 96B may be adjusted in cross sectional area by raising or lowering gates, such as the gate indicated by reference numeral 102 in FIG. 4, employed as illustrated by way of example and not limitation, to cover or uncover the eduction port 94A. Gate 102 slides up and down through a pair of guide channels 106A and 106B disposed on either side of the gate 102 and attached, as by welding, to the interior of straight section 44 of outer wall 20. As illustrated in FIG. 5, the gate 102 may be secured in a plurality of vertical positions by placing a link from an adjustment chain 108 into a slot 110 cut in the upper edge of angle iron strut or stanchion 112, mounted at the upper edge of the feedwell wall 20. Guide pipe 114, welded to strut 112, accommodates chain 108 immediately below slot 110. Clarified liquor from settling tank 12, indicated generally as 114, may flow through an eduction port such as port 94A and into a launder such as launder 80A as illustrated, thereby diluting the influent feed stream. It will be recognized that any means or manner of adjustably uncovering the eduction ports, such as a horizontally sliding gate, a rotary sliding valve gate, a hinged gate, a stopcock, or any other suitable means known in the art may function to control the amount of dilution liquor allowed to educt into the launder. The adjustment means may be manual or mechanical.

Figure 6:
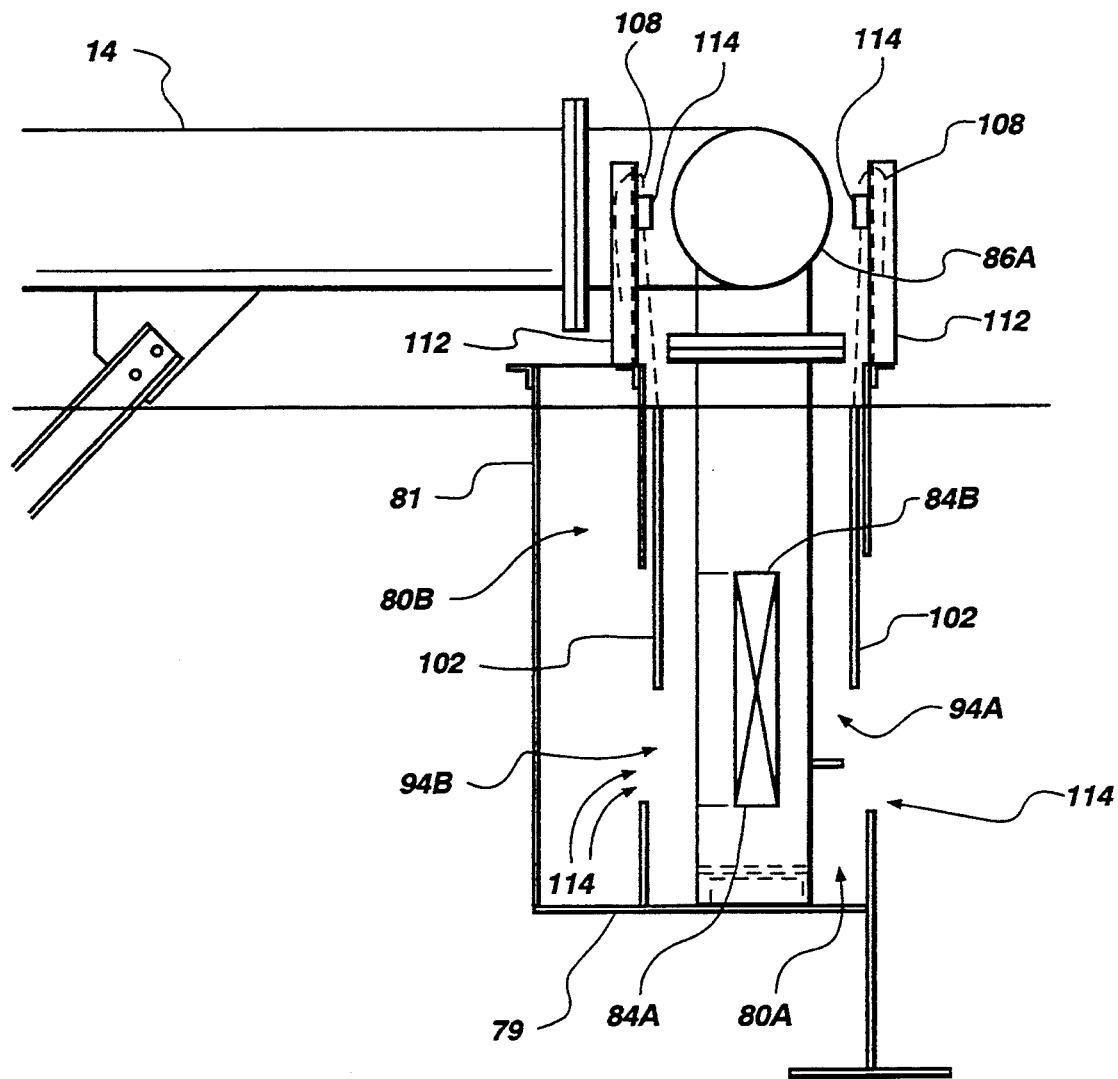
FIG. 6 is a sectional elevation view of the influent feed stream delivery pipe, directional nozzle, and eduction apertures as viewed looking into a directional nozzle.

Referring to FIG. 6, the relationship between a directional nozzle such as 84B, eduction ports such as 94B and 96B, and a launder such as 80B is illustrated in sectional elevation as viewed looking into the port of nozzle 84B. An influent feed stream exiting nozzle 84B accelerates due to the previously described jet pump effect as it proceeds into narrow throat 90B. The accelerating feed stream causes dilution liquor, indicated as 114, to be educted into launder 80B through eduction ports 94B and 96B. The eduction ports may assume a variety of shapes such as square, round, oblong, or rectangular according to the need for particular flow characteristics of a feed stream in a particular application.

The proximity of ports 94A and 94B, and 96A and 96B with respect to nozzles 84A and 84B, and the depth of the ports beneath the surface of the dilution liquor may also be varied. The flow rate of educted dilution liquor through an eduction port is a function of port size, port location with respect to the nozzle adding the feed stream, and port location with respect to the surface of the liquid covering the port. In general, a large port, close proximity to the nozzle, and close proximity to the surface are factors which allow a larger quantity of dilution liquor to educt through the port. Conversely, a small port positioned further from the nozzle, and further beneath the liquid surface, minimizes the eductive effect on the dilution liquor. The position of a port such as port 94B or 96B in FIG. 6 can be adjusted with respect to proximity to nozzle 84B by utilizing a horizontally sliding gate having a window therein; as can the vertical position of port 94B or 96B be adjusted by utilizing a vertically sliding gate including a window. Alternatively, telescoping nozzles may be employed to horizontally extend and retract the nozzle mouth, and/or the nozzles may be deployed at telescoping or otherwise vertically-adjustable feed pipe branches to vary nozzle depth with respect to the eductor ports and the surface of the liquor in the settling tank.

Referring again to FIG. 3, in operation, an influent feed stream is pumped through feed pipe 14 and directed to flow into launders 80A and 80B by directional nozzles 84A and 84B. As the feed stream flows toward the launder outlets 88A and 88B and into narrow throats 90A and 90B, it must increase in velocity according to the principles of free-surface flow of liquid through a converging throat and diverging wall arrangement. The increase in velocity creates a reduced pressure area into which dilution liquor educts through ports 94A and 94B, and 96A and 96B to dilute and mix with the feed stream. As the diluted feed stream flows into throats 90A and 90B of annular channel 22, the diluent and influent are thoroughly mixed by the turbulence from the increased flow velocity through the throat of the channel. The diluted influent flows into discharge zones 92A and 92B where a flocculating reagent may be added by adjustable position flocculating headers 120A and 120B as illustrated in FIGS. 1 and 2. Multiple banks of flocculating headers and headers disposed in a variety of patterns and orientations may also be used according to the requirements of the particular application.

Figure 7:
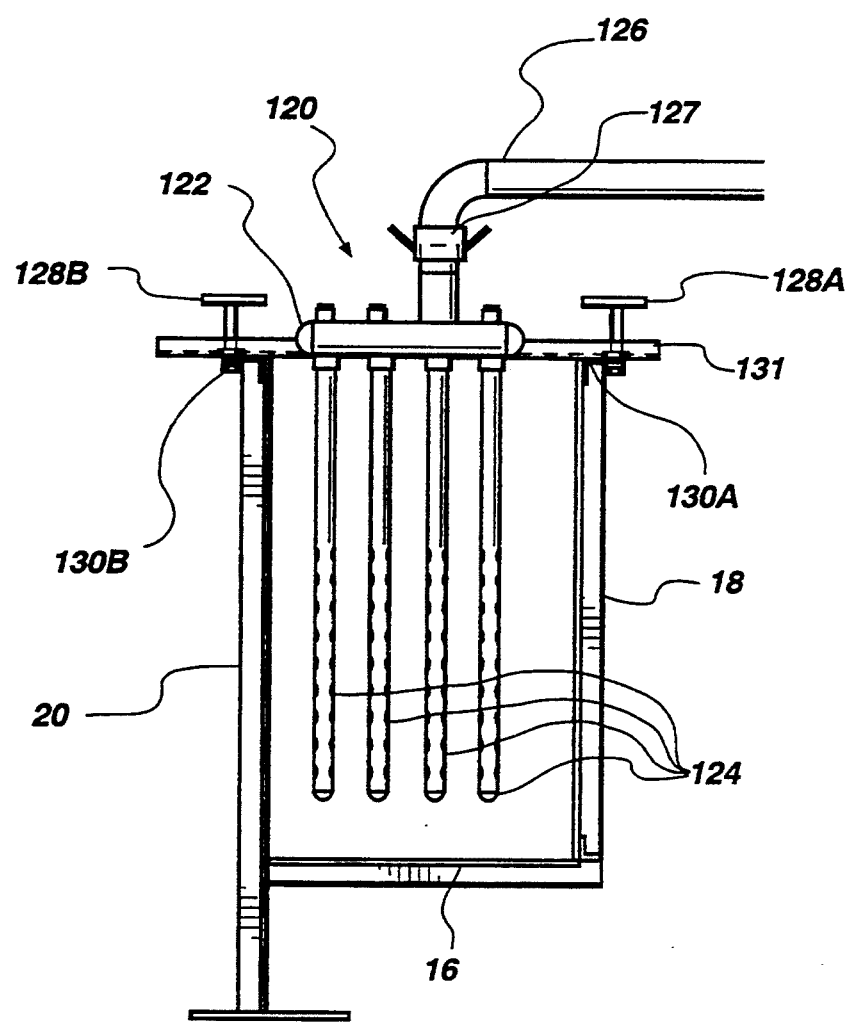
FIG. 7 is a front elevation view of a flocculating header for use with the present invention.

Referring to FIG. 7, illustrating the details of a preferred embodiment of a flocculating header 120, the flocculating header 120 includes a manifold 122 with a plurality of flocculent nozzles 124 depending therefrom. A flocculent feed line 120 attaches to manifold 122 via rotary coupling 127 and extends to an external flocculent source to supply flocculating reagent to manifold 122. Flocculating header 120 may be attached to the top of feedwell walls 18 and 20 as illustrated by means of clamps 128A and 128B which slidingly cooperate with lips or flanges 130A and 130B on the tops of walls 18 and 20, respectively, being laterally moveable in slotted hanger 131 to accommodate varying widths of channel 22, to permit adjustment of the location and orientation of header 120 in a discharge zone 92, as shown with respect to headers 116A and 116B in FIGS. 1 and 2. Such an adjustment may be facilitated by the use of flexible feed line 126 or, as shown, rigid feed pipes 126 rotationally mounted at positions 132 (see FIG. 1) to a feed pipe. The flocculent header illustrated in FIG. 7 represents one structure for adding flocculating reagent to an influent. Other structures may be envisioned to accomplish the same purpose as flocculating header 120 without departing from the spirit of the invention.

Referring again to FIG. 1, after flocculation, the diluted influent flows into the wider semi-circular portion of annular channel 22 past joints 24A and 24B where flow velocity decreases and the flocculated influent is allowed to still to a slow laminar flow state. The flocculated influent then flows into the open-bottom portion of channel 22 where it is discharged and disperses into the settling tank. Flow is continuous through the feedwell and no pump or gravity feed is required to dilute the influent feed stream.

It should be noted that, in lieu of educting dilution liquid from the main volume of the settling tank or thickener, it is also contemplated that clean liquor, free of scum or floating material may be drawn from the collection trough or overflow launder 13 to dilute the influent feed stream. In such an arrangement, a pipe or other suitable conduit extends from launder 13 to the launder zone of each eductor structure associated with settling tank or thickener 12. It is further contemplated that the clean liquor may be used totally in lieu of liquid from the main tank volume, or in combination therewith as desired. In the former case, eduction ports 94 and 96 would be deleted, while in the latter they would remain.

Figure 8:
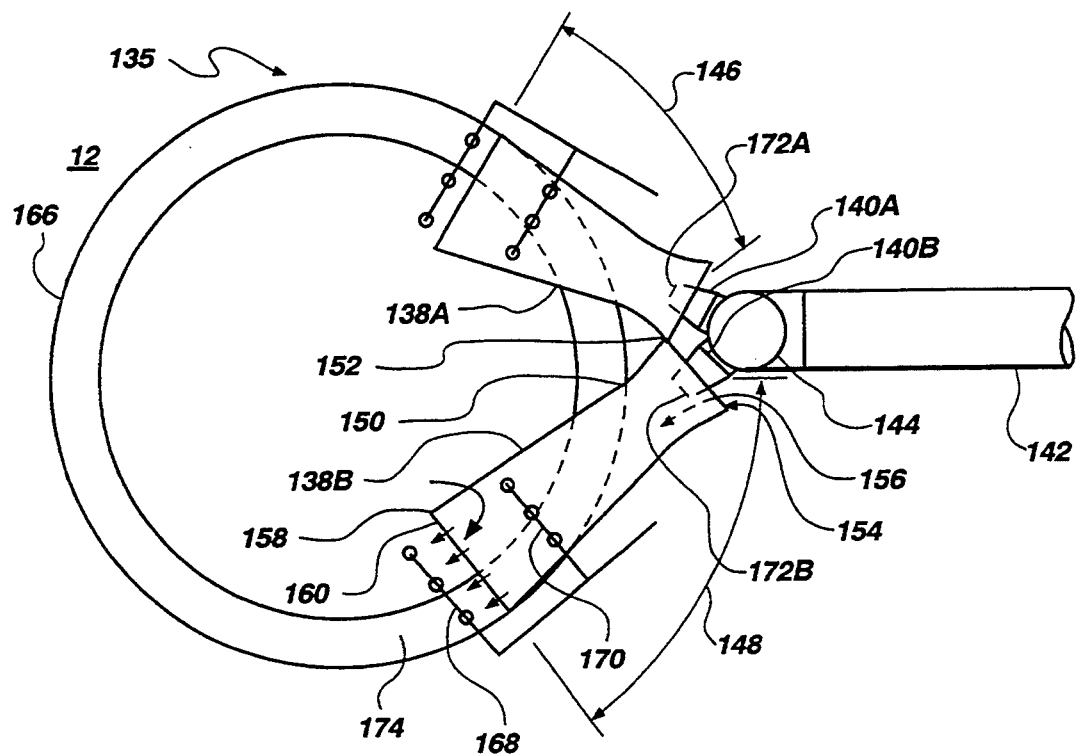
FIG. 8 is a plan view of a first alternative embodiment of the eductive feedwell of the present invention.

Referring to FIG. 8, in an alternate embodiment of a substantially circular self-diluting eductive feedwell 135 according to the present invention, a pair of eductor tubes 138A and 138B are associated with feedwell 135 and receive an influent feed stream from a pair of directional nozzles 140A and 140B supplied by feed pipe 142 through feed manifold 144. Feedwell 135 is disposed in a settling tank, the boundaries of which are not shown. The two nozzle and tube eductor assemblies, bracketed and indicated by reference numbers 146 and 148 are substantially identical and function in the same manner, but are in contraposition to each other. Both eductor assemblies, 146 and 148, are oriented so that flow therethrough and into feedwell 135 is substantially tangential to the arc of the feedwell wall. To simplify discussion of the assemblies, only assembly 148 will be described in detail.

Eductor tube 138B has a generally cylindrical shape with a constriction in diameter, or throat 150, adjacent inlet end 152. Inlet end 152 has an inlet port 154 opening into an internal passageway 156 extending the length of eductor tube 138B. The inside diameter of internal passageway 156 constricts at throat 150 and then gradually enlarges between throat 150 and a discharge end 158 having discharge port 160.

Figure 9:
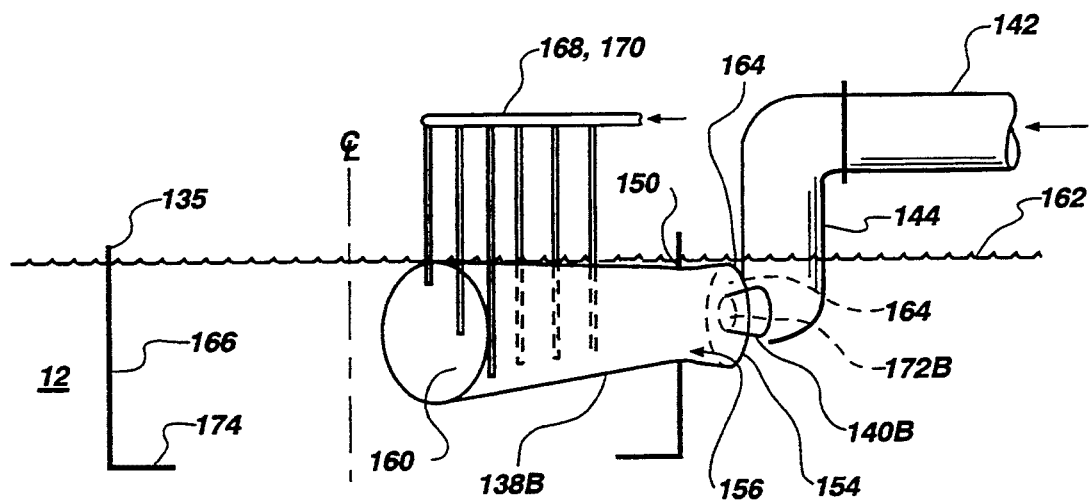
FIG. 9 is partial sectional elevation view of the tubular eductor member, directional nozzle, and feed stream delivery pipe of the embodiment illustrated in FIG. 8.

Referring to FIG. 9, eductor tube 138B is mounted with respect to feedwell 135 so that inlet port 154 of the eductor tube 138B is below the surface 12 of the liquid in the settling tank or thickener. Directional nozzle 140B is mounted in the tank and positioned so that the nozzle is inserted into inlet port 154 and directed into internal passageway 156. The outside diameter of directional nozzle 140B is smaller than the inside diameter of inlet port 154 so that an annular gap 164 is defined between the nozzle 140B and the interior wall of eductor tube 138B. Annular gap 164 is in fluid communication with the clarified liquid in the settling tank.

Referring again to FIG. 8, internal passageway 156 of eductor tube 138B opens through discharge port 160 into a volume bounded by generally circular feedwell outer wall 166. A flocculating header 18, such as the type illustrated by reference number 120 in FIG. 7, may be located proximal discharge end 158 of eductor tube 138B to add a flocculating reagent to influent flowing through the eductor tube 138B. A second flocculating header 170 may be disposed within internal passageway 156 according to the requirements of a particular application.

In operation, an influent feed stream is pumped through feed pipe 142 and is diverted bi-directionally by manifold 144 into directional nozzles 140A and 140B. With respect to nozzle and tube assembly 148, the feed stream exits the nozzle port 172B and is discharged into the internal passageway 156 of the eductor tube 138B. As the feed stream moves through the internal passageway 156, the flow velocity increases through throat 150 as previously discussed with respect to the narrow throat portion of the eductors depicted in FIGS. 1, 2, and 3. The flow of influent through throat 150 of eductor tube 138B causes dilution liquor from the settling tank to be educted into internal passageway 156 through the circular gap 164 between directional nozzle 140B and the interior wall of eductor tube 138B. The dilution ratio may be adjusted by raising and lowering the tubular tube 138B and directional nozzle 140B in the settling tank to control the amount of dilution liquor educted into internal passageway 156. Alternatively, eductor tubes 138A and 138B may be vertically fixed, and directioned nozzles 140A and 140B horizontally movable with respect to the eductor tubes inlet ends.

Diluted influent discharged from internal passageway 156 of eductor tube 138B through discharge port 160 may be flocculated by flocculating headers 168 and 170 before being added to the volume defined by circular feedwell wall 166. Circular feedwell 135 may be an open bottom type or have a spill lip 174 over which the diluted and flocculated influent flows downwardly into a settlement tank or basin. It is also contemplated that feedwell 135 could have an inner wall so that a channel is defined in the same manner as with feedwell 10, the diluted and flocculated influent entering the basin through an unfloored portion of the channel.

Figure 10:
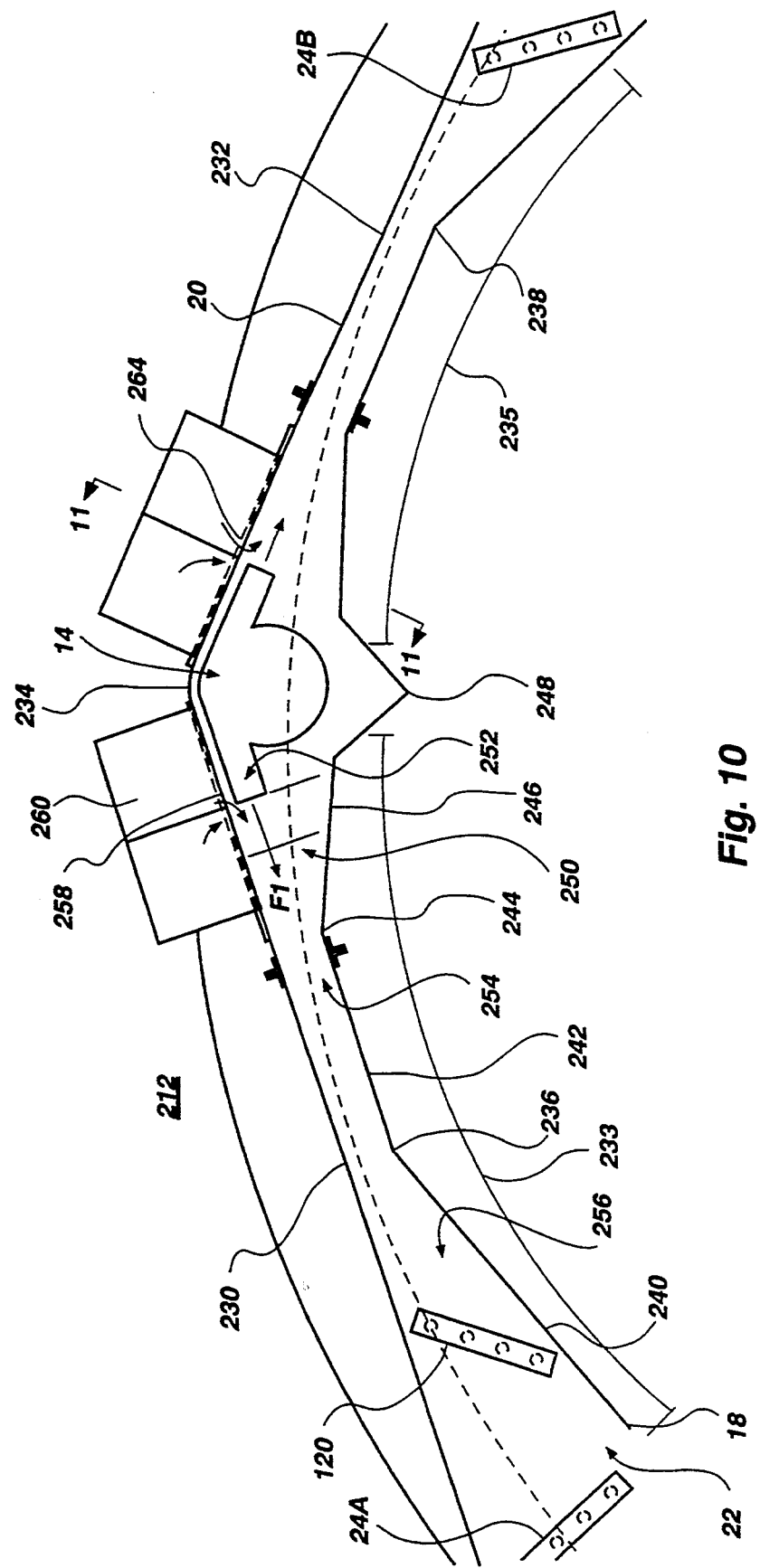
FIG. 10 is an enlarged plan view of a second alternative embodiment of an eductor structure suitable for use with the feedwell of the present invention.
Figure 11:
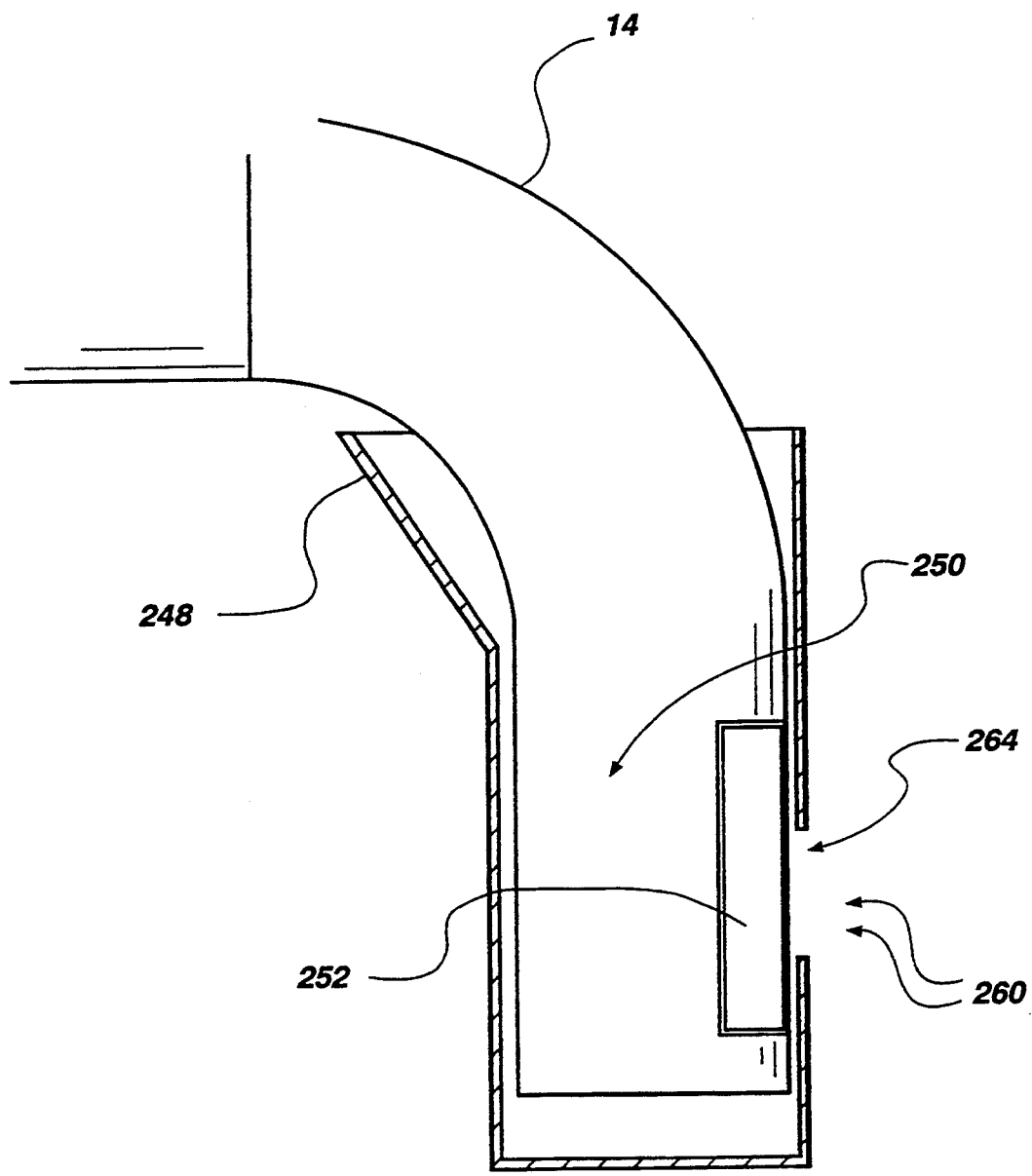
FIG. 11 is an enlarged sectional elevation view taken along lines 11—11 on FIG. 10 of the influent delivery pipe, nozzle, and eduction port.

Referring to FIGS. 10 and 11, an alternative embodiment of an eductor suitable for use with feedwell 10 is depicted. As with the embodiment of FIGS. 1-3, outer feedwell wall 20 ceases to bend in an arcuate path at joints 24A and 24B and bends inwardly to form two straight sections 230 and 232 which extend toward one another and meet at joint 234. A shallow or wide V-shape in the outer feedwell wall 20 results, with the point of the V being at joint 234, and the arms of the V extending out to connect with the arcuate portion of outer wall 20 at joints 24A and 24B. Two substantially identical feed slurry dilution and treatment branches or zones, bracketed and indicated by reference numerals 233 and 235, extend outward in a V-shape from joint 234. The function of the two flat outer sides 230 and 232 will be discussed in connection with the operation of the invention. In an alternate embodiment, a single flat side connects between joints 24A and 24B, or an arcuate wall of a greater radius than that of feedwell 10 may be employed.

Inner feedwell wall 18 also ceases to bend in an arcuate path at joints 24A and 24B and converges toward straight outer wall sections 230 and 232 in two straight paths terminating at first bends 236 and 238. To simplify description of the two identical feedwell dilution and treatment branches, only branch 233 will be described in detail. Branch 235 has the same structure assembled in contraposition, and functions in an identical manner. Straight inner wall section 240 is formed by the portion of inner feedwell wall 18 between joint 24A and bend 236. Bend 236 is oriented so that wall portion 242 of inner wall 18 is caused to be parallel with flat portion 230 of outer wall 20. A second bend 244 in inner wall 18 is oriented so that inner wall portion 246 is caused to diverge from the parallel relationship with outer wall portion 230. Inner wall portion 246 is connected to the duplicate wall structure of the second treatment zone by a V-shaped portion 248, which provides structural rigidity, connects the ends of inner wall 18, and provides a liquid path around feed pipe 14 to equalize pressures between the two side thereof.

The straight feedwell wall sections in both inner feedwell wall 18 and outer feedwell wall 20 give rise to several slurry eductor zones or portions in annular channel 22. Launder zone 250 in plan view is generally triangularly shaped and functions as a launder to receive an influent slurry stream. Influent feed slurry is pumped through feed pipe 14 and diverted by nozzle 252 into launder zone 250. The nozzle is directed so that the flow direction, indicated by F1, is parallel with outer feedwell flat wall section 230. Launder zone 250 funnels the influent feed slurry into throat 254. Throat 254, in turn, delivers the feed slurry into discharge zone 256. The progressive converging of the feedwell walls from launder zone 250 through throat 254, followed by divergence of the walls in discharge zone 256, creates an eductor that accelerates the influent feed stream through the throat. Nozzle 252 is preferably of rectangular cross section, as shown, or may be of a square, round, ovoid or other suitable configuration.

The eductor effect previously described functions to educt clarified liquor from settling basin 212 into launder zone 250 through eduction port 258, to dilute the influent feed stream. Eduction port 258 permits fluid communication between launder zones 250 and settling tank 212, and is preferably adjustable in cross sectional area. Clarified liquor from settling tank 12, indicated generally as 260, may flow through eduction port 258 into launder zone 250, thereby diluting the feed stream. Referring to FIG. 11, the relationship between nozzle 252, eduction port 264, and launder zone 250 is illustrated in sectional elevation as viewed looking into the port of nozzle 252. Feed slurry exiting nozzle 252 accelerates, due to the previously described eductive effect, as it passes eduction port 264. The accelerating feed slurry and associated low pressure zone causes dilution liquor 260 to be educted into launder zone 250 through eduction port 258.

As with the embodiment of FIGS. 1-3, a variety of adjustable eduction port and flocculent header designs may be employed in the embodiment of FIGS. 10 and 11. While the latter embodiment is somewhat simpler in configuration than the former, it is less preferred as it is more limited in capacity and believed to be less efficient in eductive performance. As with the previously-described embodiments, the orientation of the eductors and the flow direction therein and therefrom is substantially tangential to the arc of the circular feedwell, so as to provide a gradual deceleration of the discharge into a low-energy, laminar flow state before dissipating into the liquor of the settling tank.

Within a range of influent feed stream flow velocities, random fluctuations in velocity do not substantially affect the dilution ratio in any of the previously described eductor embodiments. If port size and position are held constant, eductive forces drawing dilution liquor into the eductors are determined by the flow rate of the influent feed stream. In general, a faster flow rate will educt more dilution liquor through the eduction port. Normal random fluctuations in influent flow rates are thus compensated for by the eductive nature of the dilution feedwell.

The embodiments hereinbefore illustrated are not intended to limit the scope of the claims which themselves recite those features which are regarded as essential to the invention. For example, a single eductor and nozzle arrangement may be employed in the present invention; the feedwell may assume a linear shape, rather than the arcuate configurations disclosed; the nozzles may be adjustable in cross sectional area so as to vary the feed stream flow rate; the outer wall of the feedwell may assume an inwardly facing concave shape, the inner wall of the feedwell may assume an outwardly facing concave shape and a round feed nozzle employed to enhance the eductive effect; a vertically adjustable depth nozzle may be employed as a means to vary the eduction flow rate; the nozzle may be adjustably movable toward and away from the throat of the eductor; the feedwell may assume a "U" shape with an inwardly-discharging eductor at one or both ends thereof; and others.

What is claimed is:

1. An apparatus for diluting an influent feed stream comprising:

a settling tank structured to provide settling of particulate material residing within liquid contained within said tank and configured to facilitate the formation of a clarified liquid phase in an upper region of said tank;

influent feed pipe means positioned relative to said tank to deliver an influent liquid slurry feed stream to said tank from an influent source external to and other than said tank, said influent feed pipe means having nozzle structure forming an outlet;

eductor means having an inlet positioned to receive said liquid slurry feed stream from said nozzle structure of said outlet, and having at least one port positioned proximate to said inlet, said port being positioned proximate to and in fluid communication with said clarified liquid phase in said tank to draw clarified liquid from said tank through said port responsive to momentum transfer between the flow of said influent liquid slurry feed and said clarified liquid; and receiving chamber structure positioned downstream from said nozzle structure to provide mixing of said influent feed stream and said clarified liquid drawn from said settling tank.

2. The apparatus of claim 1 wherein said eductor means further comprises a first angled wall area converging toward a throat structure defined by a second wall and a discharge structure adjacent said throat structure, said discharge structure being defined by a third wall diverging from said throat structure, said first angled wall area defining said receiving chamber structure, said second wall of said throat structure providing a reduced area relative to said first angled wall area and to said discharge structure, and further wherein said nozzle structure is positioned to directionally discharge said influent liquid slurry feed stream into said receiving chamber structure.

3. The apparatus of claim 2 wherein:

said first, second and third wall structures are contiguous, and each of said first, second and third wall structures comprise laterally spaced apart walls defining a flow channel therebetween; and said at least one eductor port extends through one of said walls proximate said first angled wall area.

4. The apparatus of claim 2, wherein said throat structure wall structure comprises substantially parallel walls.

5. The apparatus of claim 3, wherein said eductor means further includes a floor extending between said laterally spaced walls, said floor defining the bottom of said channel.

6. The apparatus of claim 2, wherein said throat structure is substantially aligned with said nozzle structure.

7. The apparatus of claim 2, wherein:

said first, second and third wall structure comprises contiguous, tubular segments defining a flow channel therebetween;

said receiving chamber structure includes an inlet in which said nozzle structure is disposed; and said at least one eductor port is defined between said nozzle structure and said first angled wall structure.

8. The apparatus of claim 7, wherein said nozzle, said inlet of said receiving chamber structure, said throat structure and said discharge structure are substantially axially aligned.

9. The apparatus of claim 2, further including header means for introducing a treatment liquid to said influent liquid slurry feed stream.

10. The apparatus of claim 9, wherein said header means is disposed in said discharge zone.

11. The apparatus of claim 1, wherein said at least one eductor port is structured to be adjustable in size.

12. The apparatus of claim 1, wherein said at least one eductor port is structured to be adjustable in elevation.

13. The apparatus of claim in claim 1, wherein said at least one eductor port is structured to be adjustable in horizontal location with respect to the delivery point of said influent liquid slurry feed stream.

14. The apparatus of claim 1, wherein said settling tank further includes an overflow launder peripherally positioned about said settling tank to receive said clarified liquid, and said at least one port of said eductor structure is positioned to provide inflow of said clarified liquid from said overflow launder of said settling tank.

15. An apparatus for diluting an influent feed stream entering into a settling tank, comprising:

a settling tank structured to facilitate formation of a clarified liquid phase in an upper region thereof;

a feedwell disposed in said settling tank, said feedwell having an outer wall defining an outer perimeter of said feedwell;

at least one eductor means connected to said feedwell, said eductor means having an inlet positioned to receive direct flow of influent liquid feed slurry thereinto, at least one eductor port proximate said inlet and positioned in and exposed to said clarified liquid phase in said upper region of said settling tank and positioned to draw said clarified liquid into said eductor means responsive to momentum transfer between the flow of said influent liquid feed slurry and said clarified liquid, and outlet structure-positioned to discharge said influent feed and said clarified liquid into said feedwell; and influent feed pipe means having a nozzle positioned to deliver said influent liquid feed slurry into said inlet from a source external to and other than said settling tank.

16. The apparatus of claim 15, wherein said feedwell is of substantially arcuate configuration, includes laterally spaced inner and outer walls defining a channel therebetween, said outer wall being disposed toward the tank wall, and wherein said at least one eductor means is formed by said channel and a nozzle disposed in said channel, said nozzle being connected to said influent feed pipe means and being positioned to direct said influent liquid feed slurry into said channel.

17. The apparatus of claim 16, wherein said at least one eductor means comprises two eductors, and said nozzle comprises two nozzles directing said influent feed stream into said channel in opposite directions.

18. The apparatus of claim 17, wherein said channel is substantially circular and said nozzles emanate from a common location.

19. The apparatus of claim 17, wherein said channel is substantially circular but for a discontinuity therein;

said discontinuity provides access from said tank to a chamber interior of said feedwell perimeter but isolated therefrom;

each of said nozzles is disposed in said channel adjacent said discontinuity and oriented in opposing directions; and said at least one eductor port comprises at least two eductor ports associated with each of said nozzles, one extending through said outer wall and another extending through said inner wall from said chamber.

20. The apparatus of claim 15 wherein said feedwell is of substantially arcuate configuration, said at least one eductor means is tubular in configuration and said nozzle is disposed in proximity to a mouth of said tubular eductor means, said mouth being positioned in said clarified liquid phase formed in said settling tank, said at least one eductor port being defined by a space formed between said nozzle and a wall of said tube, and said outlet structure being connected to said feedwell.

21. The apparatus of claim 20, wherein said at least one eductor means comprises two eductors which discharge in opposite directions substantially tangentially into said feedwell.

22. An apparatus for diluting an influent feed stream entering into a settling tank, comprising:
   a settling tank;
   a feedwell disposed in said settling tank, said feedwell having an outer vertical wall defining a perimeter;
   an overflow launder positioned proximate said settling tank and positioned to receive clarified liquid from said tank;
   at least one eductor means having an inlet positioned to receive direct flow of an influent liquid feed slurry thereinto, at least one eductor port positioned proximate to said inlet and being in fluid communication with said overflow launder to receive clarified liquid from said overflow launder, and an outlet means positioned in relation to said feedwell to provide direct flow of influent liquid feed slurry and clarified liquid thereto; and
   influent feed pipe means having nozzle means for delivering said influent liquid feed slurry to said inlet.

23. An apparatus for diluting an influent feed stream entering into a settling tank, comprising:
   a settling tank having a wall defining a perimeter;
   a substantially arcuate feedwell disposed in said tank, said feedwell being structured with an inner wall and an outer wall proximate said tank wall, said inner wall and said outer wall providing a channel therebetween having a discontinuity, said discontinuity providing an access from said tank to a chamber interior to said feedwell;
   two eductors, each eductor being formed by a nozzle positioned in said channel adjacent said access in said channel, said nozzles being disposed within said channel to provide direct flow of said influent feed stream thereto;
   eductor ports associated with each eductor, said eductor ports being formed through said inner wall and said outer wall in proximity to said nozzles; and
   a feed pipe structured to deliver said influent feed stream to said nozzle of each said eductor.

24. An apparatus for diluting an influent feed stream comprising:
   a settling tank structured to provide settling of particulate material residing within liquid contained within said tank and configured to facilitate the formation of a clarified liquid phase in an upper region of said tank;
   an overflow launder peripherally positioned about said settling tank to receive said clarified liquid from said settling tank;
   influent feed pipe means positioned to deliver an influent liquid slurry feed stream to said tank from an influent source external to and other than said tank, said influent feed pipe means having nozzle structure forming an outlet;
   eductor means having an inlet positioned to receive said liquid slurry feed stream from said nozzle structure of said outlet, and having at least one port positioned proximate to said inlet and positioned adjacent to and in direct fluid communication with said overflow launder to educt clarified liquid into said eductor port responsive to momentum transfer between the flow of said influent liquid slurry feed and said clarified liquid; and
   receiving chamber structure positioned downstream from said nozzle structure to provide mixing of said influent feed stream and said clarified liquid drawn from said settling tank.

25. The apparatus of claim 1 further comprising means for reducing flow velocity of said admixed influent feed stream and clarified liquid, said flow velocity reduction means being positioned downstream from said receiving chamber structure.

26. The apparatus of claim 25 wherein said means for reducing flow velocity is a diffuser connected to said receiving chamber structure.

27. The apparatus of claim 25 wherein said means for reducing flow velocity is a feedwell.

28. The apparatus of claim 25 wherein said means for reducing flow velocity is a baffle structure.

29. The apparatus of claim 15 wherein said outlet structure is positioned to discharge said influent feed and said clarified liquid into said feedwell in a direction tangential to said outer wall of said feedwell.

* * * * *

UNITED STATES PATENT AND TRADEMARK OFFICE
CERTIFICATE OF CORRECTION

PATENT NO. : 5,389,250

DATED : February 14, 1995

INVENTOR(S) : Wood et al.

It is certified that error appears in the above-indentified patent and that said Letters Patent is hereby corrected as shown below:

On the title page, item [54] and column 1, line 2, insert a hyphen between "SELF" and "DILUTING";

In Column 7, line 21, change "120" to --126--;

In Column 8, line 25, change "12" to --162--;

In Column 8, line 39, change "18" to --168--;

In Column 11, line 65, after "nozzle" insert --structure--; and

In Column 12, line 37, delete the hyphen between "structure" and "positioned".

Signed and Sealed this

Twenty-third Day of May, 1995

*Attest:*

BRUCE LEHMAN

*Attesting Officer*   *Commissioner of Patents and Trademarks*